(No Model.)
P. L. SHEPLER.
FOLDING DESK.
No. 272,164. Patented Feb. 13, 1883.
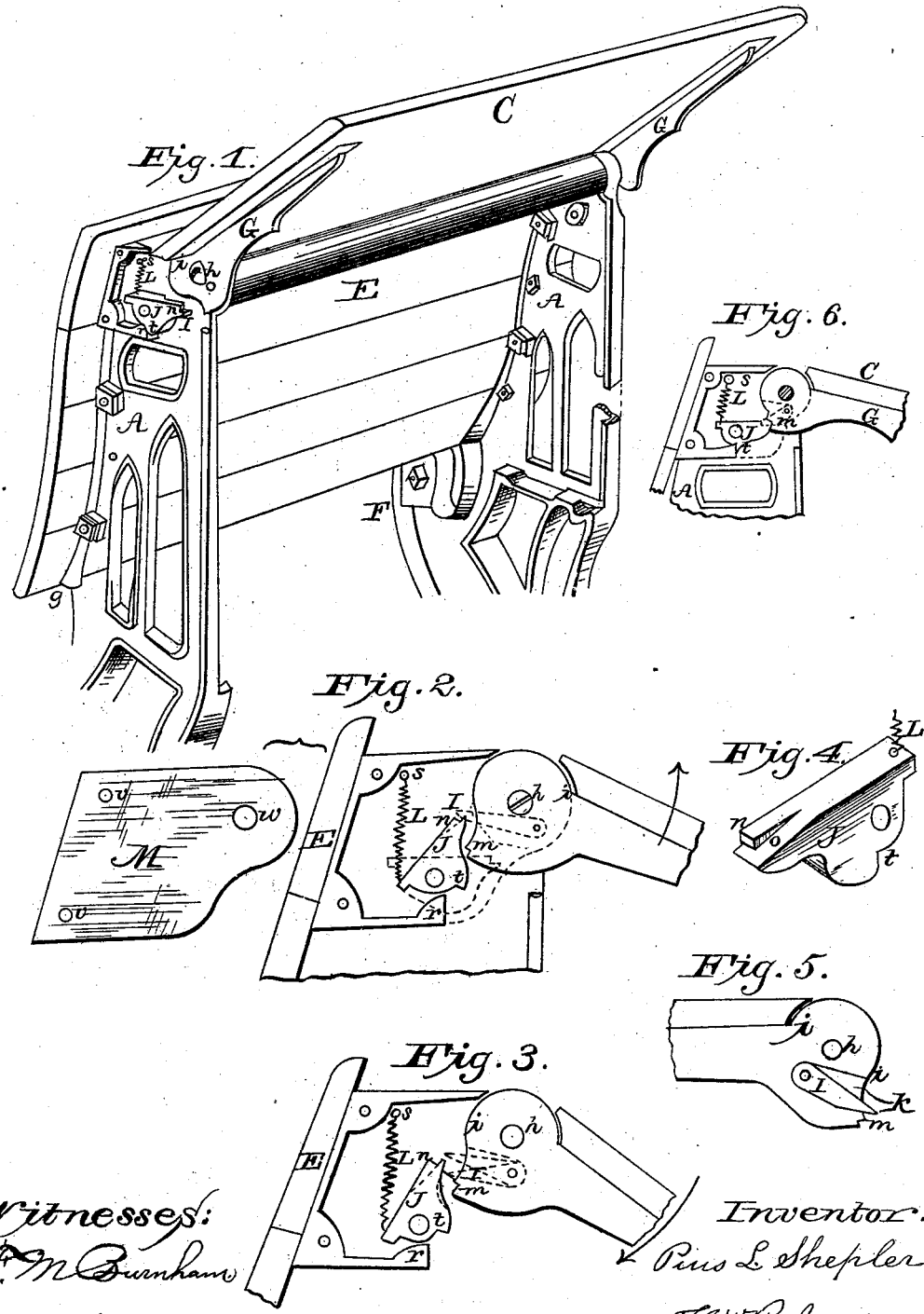

UNITED STATES PATENT OFFICE.

PIUS L. SHEPLER, OF TOLEDO, OHIO, ASSIGNOR OF ONE-HALF TO WM. H. CRAY AND A. E. ROOD, OF SAME PLACE.

FOLDING DESK.

SPECIFICATION forming part of Letters Patent No. 272,164, dated February 13, 1883.

Application filed October 25, 1882. (No model.)

*To all whom it may concern:*

Be it known that I, PIUS L. SHEPLER, of Toledo, in the county of Lucas and State of Ohio, have invented new and useful Improvements in Folding Desks; and I hereby declare that the following is a full, clear, and exact description thereof, reference being had to the accompanying drawings, which form a part of this specification.

My invention relates to folding desks especially adapted for school purposes, as set forth in my application for a patent filed July 27, 1882; and the novelty consists, essentially, in the construction and adaptation of a hinge which connects the leaf to the standards, as will be more fully hereinafter set forth, and specifically pointed out in the claims.

The invention is fully illustrated in the accompanying drawings, which form a part of this specification, and in which—

Figure 1 is a perspective view with the leaf elevated; Fig. 2, an enlarged detail section, showing the leaf-joint with the covering-plate removed; Fig. 3, a similar view, showing the leaf in a different position. Fig. 4 is an enlarged and detached view of the cam which forms a part of the leaf-hinge; Fig. 5, an enlarged detail view of the reverse side of one of the leaf-arms, and Fig. 6 a detail showing the leaf in position for use.

Referring to the drawings, A represents the standards of the desk, and G the leaf-arms pivoted thereto, which support the leaf C. The inner ends of these arms G are made in the form shown in Figs. 2, 3, and 5, upon a true curve from $i$ to $i$, $h$ being the axis of this circular portion.

Within a segmental recess, $k$, formed upon the inner face of the arm G is pivoted the dog I, which projects beyond the concave position of the head of the arm, as shown in Fig. 5.

In the head of the arm G, and below the concave portion, is formed a notch, $m$, and within a recess upon the standard A is pivoted the cam J, as clearly shown in Figs. 1 and 4, upon the upper surface of which is an incline, $o$.

Secured to one end of the cam J is a spring, L, the opposite end of which is secured to a pin, $s$, or other fixed point above. This cam is also provided with a notch or shoulder, $t$, and the standard with a shoulder, $r$.

When the leaf C is in position for use, the notch $m$ in the arm G abuts against the shoulder $n$ upon the cam J, while the notch $t$ upon this cam engages the shoulder $r$ upon the standard, while the joint of the dog I rests upon the inclined plane $o$ of the said cam, and the leaf is thus held rigidly against downward pressure. In order to release these parts from engagement and allow the leaf to be folded downward against the standard, the outer edge of the leaf is first elevated to the position shown in Fig. 1, which withdraws the head of the arm G from engagement with the cam J, and allows the dog I to drop in its recess $k$ until its projecting point is presented below the adjacent end of the cam, when, by lowering the leaf, the dog I will come in contact with the under surface of the cam and turn it upward on its pivot against the force of the spring L, as seen in Fig. 3. When the leaf has assumed a nearly vertical position, the dog I slides up on the incline $o$, the cam is released, and the spring L forces it back to its normal position, as shown in Fig. 1. In placing the leaf again into operative position it is only necessary to elevate it far enough to have the shoulders $m$ and $n$ engage.

M represents a plate which covers the ends of the standards at the joint described, and is secured in place by bolts inserted through the holes $v$, while the screw $h$, passing through the hole $w$, allows the said plate to be more tightly or loosely secured to place, and thus act as a tension upon the hinge which it covers, and loss by wear may be taken up without removing any of the parts. This feature, in connection with the other parts claimed, I deem to be important.

From the foregoing description the operation of the device is obvious.

What I claim is—

1. In a folding desk, the pivoted cam J, having projections $t$ and $n$, pivoted to the standard, and engaging, respectively, with projections on the standard and arm, combined with the standard A, having shoulder $r$, arm G, having shoulder $m$, and dog I, as set forth.

2. The arm G, pivoted to the standard, having shoulder $m$, engaging with a projection on the cam J, and dog I, combined with the cam J, having shoulders $n$ and $t$, and incline $o$, the spring L, and standard A, having shoulder N, as set forth.

PIUS L. SHEPLER.

Witnesses:
PAUL RAYMOND,
CHARLES DODGE.